US011981842B2

(12) United States Patent
Braam et al.

(10) Patent No.: US 11,981,842 B2
(45) Date of Patent: May 14, 2024

(54) TACKIFIER FOR LACTIC ACID BASED HOT-MELT ADHESIVE

(71) Applicants: PURAC BIOCHEM B.V., Gorinchem (NL); HENKEL AG & CO. KGAA, Duesseldorf (DE); INGEVITY UK LTD., Warrington (GB)

(72) Inventors: Kevin Bernardus Braam, Gorinchem (NL); Chris Francois Hubert Schaekens, Gorinchem (NL); Rick Jeffrey Van Strien, Gorinchem (NL); Remco Johannes Antonius Stevens, Gorinchem (NL)

(73) Assignees: PURAC BIOCHEM B.V., Gorinchem (NL); HENKEL AG & CO. KGAA, Duesseldorf (DE); INGEVITY UK LTD., Warrington (GB)

( * ) Notice: Subject to any disclaimer, the term of this patent is extended or adjusted under 35 U.S.C. 154(b) by 772 days.

(21) Appl. No.: 17/265,298

(22) PCT Filed: Dec. 18, 2019

(86) PCT No.: PCT/EP2019/086006

§ 371 (c)(1),
(2) Date: Feb. 2, 2021

(87) PCT Pub. No.: WO2020/127521

PCT Pub. Date: Jun. 25, 2020

(65) Prior Publication Data

US 2021/0348035 A1 Nov. 11, 2021

(30) Foreign Application Priority Data

Dec. 21, 2018 (EP) .................................... 18215059

(51) Int. Cl.

| | |
|---|---|
| ***C09J 7/35*** | (2018.01) |
| ***C08G 63/08*** | (2006.01) |
| ***C08G 81/00*** | (2006.01) |
| ***C08K 5/053*** | (2006.01) |
| ***C09J 11/06*** | (2006.01) |
| ***C09J 11/08*** | (2006.01) |
| ***C09J 167/04*** | (2006.01) |

(52) U.S. Cl.

CPC ................ *C09J 7/35* (2018.01); *C08G 63/08* (2013.01); *C08G 81/00* (2013.01); *C08K 5/053* (2013.01); *C09J 11/06* (2013.01); *C09J 11/08* (2013.01); *C09J 167/04* (2013.01); *C08G 2170/20* (2013.01); *C08G 2390/00* (2013.01); *C09J 2301/304* (2020.08); *C09J 2301/408* (2020.08); *C09J 2301/414* (2020.08); *C09J 2453/00* (2013.01); *C09J 2467/00* (2013.01)

(58) Field of Classification Search

CPC ..... C09J 7/35; C09J 11/06; C09J 11/08; C09J 167/04; C09J 2301/304; C09J 2301/408; C09J 2301/414; C09J 2453/00; C09J 2467/00; C09J 2301/312; C08G 63/08; C08G 81/00; C08G 2170/20; C08G 2390/00; C08K 5/053

See application file for complete search history.

(56) References Cited

FOREIGN PATENT DOCUMENTS

| | | | |
|---|---|---|---|
| WO | 95/10577 | A1 | 4/1995 |
| WO | 2015/150580 | A1 | 10/2015 |
| WO | 2017/055044 | A1 | 4/2017 |
| WO | 2017/149019 | A1 | 9/2017 |

OTHER PUBLICATIONS

Feb. 11, 2020 International Search Report issued in International Patent Application No. PCT/EP2019/086006.

Feb. 11, 2020 Written Opinion issued in International Patent Application No. PCT/EP2019/086006.

Ioannis Arvanitoyannis et al. Synthesis and Degradability of a Novel Aliphatic Polyester Based on L-Lactide and Sorbitol: 3". Polymer, Elsevier Science Publishers B.V., vol. 37, No. 4, Feb. 1, 1996, pp. 651-660.

Qinghui Hao et al. "Preparation and Crystallization Kinetics of New Structurally Well-Defined Star-Shaped Biodegradable Poly(L-Lactides)s Initiated With Diverse Natural Sugar Alcohols". Biomacromolecules, vol. 6, No. 4, 2005, pp. 2236-2247.

*Primary Examiner* — Scott R. Walshon

(74) *Attorney, Agent, or Firm* — Oliff PLC

(57) ABSTRACT

A lactic acid based hot-melt adhesive with an amorphous lactic acid oligomer tackifier. A hot-melt adhesive (HMA) includes: a lactic acid and caprolactone copolymer resin, a crystalline lactic acid oligomer wax, and said amorphous lactic acid oligomer tackifier, characterized in that the amorphous lactic acid oligomer tackifier includes an amorphous polymerisation product of a) lactic acid monomer and b) a multifunctional polymerization initiator containing three or more hydroxy and/or amino groups. The use of the amorphous lactic acid oligomer tackifier in a lactic acid-based hot-melt adhesive, to a method for adhering substrates together using a hot-melt adhesive including said amorphous lactic acid oligomer tackifier, and to a specific amorphous lactic acid oligomer tackifier and a method of its preparation.

14 Claims, No Drawings

TACKIFIER FOR LACTIC ACID BASED HOT-MELT ADHESIVE

The instant invention relates to a lactic acid based hot-melt adhesive with an amorphous lactic acid oligomer tackifier. The invention also relates to the use of the amorphous lactic acid oligomer tackifier in a lactic acid-based hot-melt adhesive, and to a method for adhering substrates together using a hot-melt adhesive comprising said amorphous lactic acid oligomer tackifier. The invention further relates to a specific amorphous lactic acid oligomer tackifier and a method of its preparation.

As used herein, "hot-melt adhesive" refers to a thermoplastic polymer composition that is heated to obtain a liquid of flowable viscosity, and after application to a substrate, cooled to obtain a solid. After the hot-melt adhesive solidifies upon cooling to a temperature below its melt temperature or below its solidification transition temperature, an adhesive bond is formed between the substrate and the adhesive material.

Hot-melt adhesives are often used to bond two substrates together so as to maintain the two substrates in a fixed relation to each other. Hot-melt adhesives are also used in articles that include a nonwoven layer to bond the nonwoven layer and a polymer film layer together. Hot-melt adhesives are further used to adhere packaging constructions e.g. bag, box, carton, case and tray together to construct the package, close the package or both. They are also used as pressure-sensitive adhesives for tapes and labels.

Properties that may be generally sought in a hot-melt adhesive for commercial application can be summarized as follows.

In the first place, the adhesion properties of the hot-melt adhesive upon use have to be good. Loss of adhesion can cause, e.g., opening of packages, which is unacceptable both during and after production. Preferably, adhesion should be good over time and over a wide range of conditions.

Further, hot-melt adhesives are conventionally provided in the form of granules or pellets, which will be molten before use. These granules should preferably be stable during storage. That is, the granules should not adhere to each other to a too large extent, as this could impede proper handling of the granules. To obtain this feature, hot-melt adhesives should not show flow at room temperature. On the other hand, when applied in molten form hot-melt adhesives should display desirable viscosity properties; i.e., should flow enough in order to be applied but should be viscous enough to stay in place.

A further property of a hot-melt adhesive is the set time, that is, the time required by the adhesive to form a bond with the substrate. The set time may be important in commercial operation because it governs the time required to press the two substrates sandwiching the adhesive together. Set time may be of the order of seconds.

On the other hand, while the set time may preferably be very short, hot-melt adhesives should also show some open time. The open time is the time after application of the adhesive at high temperature during which the adhesive still has flow properties. This is the time frame after application of the adhesive onto the carrying substrate during which the covering substrate can be applied while obtaining good adhesion.

A further property which may be desirable for hot-melt adhesives is a certain degree of biodegradability or compostability. Where the hot-melt adhesive is used in the manufacture of objects which are to be composted, it is important that the adhesive can be degraded within the same time frame as the rest of the object. This feature may be of particular relevancy where the hot-melt adhesive is used in the manufacture of packaging material.

Further, it may be preferred for hot-melt adhesives to be at least partially derivable from renewable resources.

A number of hot-melt adhesives which are at least partially biodegradable and/or derived from renewable resources, also referred to as biobased hot-melt adhesives, have been described.

For instance, WO 95/10577 describes a hot-melt adhesive composition made using a polyester derived from lactic acid. According to this publication, a thermoplastic resin grade polyester can be formulated into a functional adhesive using adhesive components and a lower molecular weight material can be used as a tackifying resin with a biodegradable/compostable resin in a formulated hot-melt adhesive.

WO 2015/150580 describes a non-reactive hot-melt adhesive containing a copolymer being substantially composed of a reaction product of lactide and caprolactone. The hot-melt adhesive may comprise a tackifier and a wax among other additives.

However, biobased hot-melt adhesives may fall behind on some of the desirable properties of hot-melt adhesives.

For instance, some biobased hot-melt adhesives may become brittle causing adhesion loss over time, or display poor adhesion properties under certain temperature ranges. Further, the viscosity of biobased hot-melts may be unsatisfactory for certain applications.

Furthermore, common additives which are typically used to modify the properties of hot-melt adhesives, e.g. tackifiers (such as commonly used hydrocarbon, rosin and terpene resins) may not to be compatible with biobased hot-melt adhesives, such as lactic acid based hot-melt adhesives.

Thus, there is a need for biobased hot-melt adhesives which do not suffer from such shortcomings.

The inventors have now found a tackifier which is compatible with and which provides desirable properties to biobased hot-melt adhesives, in particular lactic acid based hot-melt adhesives.

More in particular, the present invention relates to a hot-melt adhesive (HMA) comprising:

a lactic acid and caprolactone copolymer resin, a crystalline lactic acid oligomer wax, and an amorphous lactic acid oligomer tackifier, wherein the amorphous lactic acid oligomer tackifier comprises an amorphous polymerisation product of a) lactic acid monomer and b) a multifunctional polymerization initiator containing three or more hydroxy and/or amino groups.

In another embodiment, the present invention relates to a hot-melt adhesive (HMA) comprising:

a lactic acid and caprolactone copolymer resin, a crystalline lactic acid oligomer wax, and an amorphous lactic acid oligomer tackifier, wherein the amorphous lactic acid oligomer tackifier has a crystallinity as defined by its enthalpy of melting of at most 2.5 J/g and comprises an amorphous polymerisation product of a) lactic acid monomer and b) a multifunctional polymerization initiator containing three or more hydroxy and/or amino groups, wherein the amorphous polymerisation product of the amorphous lactic acid oligomer tackifier has a number average molecular weight ($M_n$) of 1000 to 10000 g/mol.

A tackifier as described herein can provide biobased hot-melt adhesives which have superior properties, e.g., when compared to the same formulation without a tackifier. In particular, hot-melt compositions as described herein may have a shorter set time and better adhesion over time. Also, it has been found that adhesion may be generally improved both at room temperature (e.g. 20 to 25° C.) and freezer temperatures (e.g. −25 to −18° C.).

Further, a tackifier as described herein may be used as a viscosity modifier to adjust the viscosity of the end hot-melt formulation to the requirements of specific applications.

Furthermore, a hot-melt adhesive as described herein is based on lactic acid which can derived from renewable resources. Further, polymeric products of lactic acid are biodegradable, and, depending on the nature of all the components in the composition, a fully biodegradable hot-melt adhesive may be obtained.

It is noted that Arvanitoyannis, I. et al., Synthesis and degradability of a novel aliphatic polyester based on lactide and sorbitol, *Polymer* 37, 651-660 (1996) describes the synthesis and analysis of a series of polyesters.

Moreover, it is noted that Hao, Q. et al., Preparation and crystallization kinetics of new structurally well-defined star-shaped biodegradable poly(L-lactide)s initiated with diverse natural sugar alcohols, *Biomacromolecules* 6, 2236-2247 (2005) relates to syntheses, structural characterization, and crystallization kinetic investigation of star-shaped poly(L-lactide)s.

However, these two references are not directed to hot-melt adhesives.

Further advantages of the present invention and specific embodiments thereof will become apparent from the further specification.

As indicated above a tackifier as described herein is an amorphous lactic acid oligomer tackifier, characterized in that it comprises an amorphous polymerisation product of a) lactic acid monomer and b) a multifunctional polymerization initiator containing three or more hydroxy and/or amino groups.

A multifunctional polymerization initiator as used herein refers to a molecule which serves as starting point for growing multiple polymeric chains of lactic acid and which does not act as a monomer. In other words, even though the initiator is part of the polymerisation product it does not co-polymerize in the growing chain of lactic acid.

The multifunctional polymerization initiator contains three or more hydroxy and/or amino groups. Having three or more hydroxy and/or amino groups forces three or more chains of lactic acid to grow in close proximity. Without being bound to any theory the inventors believe that the number of lactic acid chains growing in close proximity may contribute to the amorphicity of the lactic acid oligomer tackifier.

The multifunctional polymerization initiator may preferably contain four or more, in particular five or more, and more in particular six or more hydroxy and/or amino groups. The inventors have found that the degree of amorphicity tends to increase with the number of hydroxy and/or amino groups of the multifunctional polymerization initiator which may be desirable for the tackifier properties of the lactic acid oligomer.

Multifunctional polymerization initiators having at least three amino groups may comprise primary and/or secondary amino groups, primary amino groups may be preferred as they may be more reactive.

Multifunctional polymerization initiators having at least three hydroxy groups may be preferably used, as initiators having at least three amino groups are not very abundant and may be more expensive and more hazardous than those having least three hydroxy groups. In a particular embodiment the multifunctional polymerization initiator may have four or more, more in particular five or more, and more in particular six or more hydroxy groups.

Suitable examples of multifunctional polymerization initiators having at least three hydroxy groups include, for instance, D-sorbitol, pentaerythritol and dipentaerythritol. D-Sorbitol may be preferred as it is a biobased initiator and therefore contributes to content of components derivable from renewable resources. Reacting such biobased initiator with lactic acid or lactide as described herein may advantageously provide a biobased tackifier. On the other hand, dipentaerythritol may be preferred with respect to the process of producing the tackifier, as it is thermally stable and may allow for a broad range of temperatures to be used. Other multifunctional polymerization initiators may include trimethylol propane, glycerol, 1,3,5-hexanetriol. Without being bound to any theory the inventors believe that the number of end-groups of a lactic acid oligomer tackifier as described herein, wherein several chains of lactic acid are together in one molecule by virtue of the multifunctional polymerization initiator, may contribute to the ability to biodegrade the tackifier at its end-of-life.

The lactic acid monomer of the amorphous polymerisation product may be derived from one or more of L-lactic acid, D-lactic acid, L-lactide, D-lactide and meso-lactide.

As a skilled person will understand in the amorphous polymerisation product the lactic acid monomeric residue derived from lactic acid or lactide of the same stereochemistry will be the same. Thus, deriving the lactic acid monomer from L-lactic acid or L-lactide will result in a polymerisation product with the same L-lactic acid monomeric residue, albeit one molecule of L-lactic acid results in one L-monomeric residue and one molecule of L-lactide results in two L-monomeric residues. Similarly deriving the lactic acid monomer from D-lactic acid or D-lactide will result in a polymerisation product with monomeric residues of the same stereochemistry. Deriving the lactic acid monomer from meso-lactide will result in a polymerisation product with both L- and D-lactic acid monomeric residues.

Deriving the lactic acid monomer from lactic acid or lactide differs on the mechanism of polymerisation: the polymerisation of lactic acid is a condensation polymerisation and the polymerisation of lactide is a ring opening polymerisation. It is emphasized that the lactic acid chain, the lactic acid oligomer and the lactic acid polymers described in this application can be manufactured both by condensation polymerization (using lactic acid as monomer material) and by ring-opening polymerization (using lactide as a monomer material), all under application of suitable polymerization conditions.

The ratio of L-lactic acid monomer to D-lactic acid monomer of the amorphous polymerization product may vary from, e.g., 50:50 to 99.9:0.1, in particular from 60:40 to 95:5, and more in particular from 80:20 to 90:10 or, alternatively, from 50:50 to 0.1:99.9, in particular from 40:60 to 5:95, and more in particular from 20:80 to 90:10.

The lactic acid monomer of the amorphous polymerization product may be preferably derived from L-lactic acid and/or L-lactide, as the L-isomer of lactic acid is more easily accessible. In a particular embodiment the amorphous polymerization product may have a L-lactic acid monomer content of 100%.

The amorphous polymerisation product of the amorphous lactic acid oligomer tackifier has a number average molecular weight ($M_n$) of 1000 to 10000 g/mol. The amorphous polymerisation product of the amorphous lactic acid oligomer tackifier may in particular have a number average molecular weight ($M_n$) of 2000-4000 g/mol, and more in particular 2500-3500 g/mol, even more in particular of about 3000 g/mol. Polymerisation products of such molecular weights may generally have relatively short chains of lactic acid monomer and may contribute to the amorphicity of the tackifier.

Within the context of the present specification, the number average molecular weight Mn is the statistical average molecular weight of all the polymer chains in the sample, and is defined by:

$$Mn=\Sigma NiMi/\Sigma Ni$$

where Mi is the molecular weight of a chain and Ni is the number of chains of that molecular weight. If Mn is quoted for a molecular weight distribution, there are equal numbers of molecules on either side of Mn in the distribution. Mn can be predicted by polymerization mechanisms and is measured by methods known in the art, e.g., methods that determine the number of molecules in a sample of a given weight; for example, colligative methods such as end-group assay may be used. In particular, the Mn may be measured by gel permeation chromatography (GPC), more in particular, using chloroform as solvent and running phase, using polystyrene as a reference and detection via Refractive Index.

Generally, the ratio of lactic acid monomer per hydroxy group or amino group of the multifunctional polymerization initiator in the amorphous polymerization product may be of 2-25, in particular 4-15, more in particular 6-10 moles of lactic acid per moles of hydroxy group or amino group. With these ratios the amount of lactic acid monomer is higher than the amount of multifunctional polymerization initiator and the lactic acid monomeric chains are kept relatively short. Higher ratio amounts of lactic acid monomer may result in products that have lower amorphicity. This may result in making the product less optimal as a tackifier for some applications.

An amorphous lactic acid oligomer tackifier as described herein may be obtained by a method comprising forming an amorphous polymerisation product by reacting a) lactic acid and/or lactide and b) a multifunctional polymerization initiator containing three or more hydroxy groups and/or amino groups until a product of a desired Mn is obtained. In a particular embodiment the method may comprise reacting a) lactic acid and/or lactide and b) a multifunctional polymerization initiator containing four or more hydroxy groups, until a polymerisation product with a number average molecular weight ($M_n$) of 1000 to 10000 g/mol is obtained or, in other words, wherein the amorphous polymerisation product has a number average molecular weight ($M_n$) of 1000 to 10000 g/mol.

In particular, the multifunctional polymerization initiator may contain four or more hydroxyl groups or any number of hydroxyl groups as defined above for the amorphous polymerisation product. The starting lactic acid and/or lactide may be as defined above for amorphous polymerisation product and is commercially available. Suitable examples of commercial lactic acid include for instance Purac® HS 100, Purac® HS 88, Purac® HS 90, Purac® Ultrapure 90, Purac® HiPure 90, Purac® HS 101 from Corbion Purac and suitable examples of commercial lactide include for instance Puralact® L, Puralact® B3 and Puralact® D. Polymerization of lactic acid is a condensation polymerization and may generally be performed in the presence of a suitable catalyst, e.g. titanium(IV) butoxide and titanium(IV) isopropoxide. Polymerization of lactide is a ring opening polymerisation and may be may generally be performed in the presence of a suitable catalyst, e.g. stannous(II) ethylhexanoate.

As a mode of example the multifunctional polymerisation initiator may be mixed with the catalyst and the lactide may be added thereto heated to a reaction temperature from 120 to 210° C., a temperature from 160 to 190° C. may be preferred as it may result in fewer side reactions and side products. Optionally an anti-oxidant may be added to the reaction mixture. The polymerization may take from 1 hour (e.g. at 210° C.) up to 2 days (e.g. at 120° C.), in particular from 1 to 3 hours (e.g. at 160 to 190° C.).

A multifunctional polymerisation initiator comprising three or more hydroxy groups may be reacted with 2-25, preferably 4-15, more preferably 6-10 moles of lactic acid per moles of hydroxy group, as described above for the polymerisation product.

The polymerisation may be stopped when the desired number average molecular weight is reached. Generally, the polymerisation may be stopped when the amorphous polymerisation product reaches a number average molecular weight ($M_n$) of 1000 to 10000 g/mol. The Mn may be determined during the polymerization by GPC as described above.

A lactic acid oligomer tackifier as described herein is amorphous. In particular, such an amorphous tackifier has a crystallinity as defined by its enthalpy of melting of at most 2.5 J/gram. The amorphous tackifier may in particular have a crystallinity as defined by its enthalpy of melting of at most 2 J/gram and more in particular 1.5 J/gram. The enthalpy of melting is measured by differential scanning calorimetry (DSC) by methods known in the art, in particular, using a heat-cool-heat cycle starting at −50° C., heating at 10° C./min up to 220° C., then cooling at the same rate and repeating the first heating step. The use of an amorphous lactic acid oligomer tackifier in a hot-melt adhesive is advantageous, because it reduces shrinkage of the adhesive during setting of the adhesive. Moreover, if an amorphous lactic acid oligomer tackifier is used, the adhesive retains some flexibility when set.

An amorphous lactic acid oligomer tackifier as described herein may have a glass transition temperature (Tg) of at least 30° C., in particular at least 35° C., more in particular at least 40° C. The use of a tackifier having such a glass transition temperature in a hot-melt adhesive is advantageous, because the tackifier will then be in the solid state at the product application temperature (i.e., when the product is in use).

An amorphous lactic acid oligomer tackifier as described herein is suitable for use in a hot-melt adhesive, in particular a biobased hot-melt adhesive, and more in particular, comprising a lactic acid and caprolactone copolymer resin and a crystalline lactic acid oligomer wax. Accordingly, the instant invention further relates to the use of an amorphous polylactic acid tackifier as described herein in a hot-melt adhesive comprising a lactic acid and caprolactone copolymer resin and a crystalline lactic acid oligomer wax, as also further described herein.

Without being bound to any theory, it is believed that the nature of the lactic acid based oligomer tackifier may contribute to the compatibility with lactic acid based hot-melt adhesives.

A particular amorphous lactic acid oligomer tackifier for use in a hot-melt adhesive as described herein comprises an amorphous polymerisation product of a) lactic acid monomer and b) a multifunctional polymerization initiator containing four or more hydroxy groups, wherein the amorphous polymerisation product has a number average molecular weight ($M_n$) of 1000 to 10000 g/mol, wherein the amorphous polylactic acid tackifier has a crystallinity as defined by its enthalpy of melting of at most 2.5 J/g and a glass transition temperature of at least 30° C. A multifunctional initiator containing four or more hydroxy groups and a Mn value within this range may further contribute to the amorphicity and compatibility of the oligomer making it particularly suitable as a tackifier for a hot-melt adhesive as described herein.

Within the context of the present specification, the term "compatible" means that a mixture of the amorphous lactic acid oligomer tackifier and the other components of the hot-melt adhesive is stable both under melting conditions and at room temperature. Stable means that upon storage at room temperature for 30 days and under melting conditions for 72 hours no phase separation occurs and the melt remains homogeneous. It is within the scope of the skilled person to determine the compatibility by simple tests, e.g., by placing an amount, e.g., 50 ml of the formulated hot-melt adhesive composition in a glass jar in an oven at a temperature above the melting temperature (without stirring), and visually assessing the properties of the product. The temperature used in the test should correspond to a temperature at which the adhesive may be used in commercial operation.

Generally, the amorphous lactic acid oligomer tackifier may be present in a hot-melt adhesive as described herein in an amount of 5-45 wt. % based on the total amount of hot-melt adhesive, in particular in an amount of 10-35 wt. %, and more in particular of 15-25 wt. %.

The presence of amorphous lactic acid oligomer tackifier as described herein in the hot-melt adhesive formulation has been found to provide good adhesion properties to the hot-melt adhesive over time and over a range of different temperatures. The presence of an excessive amount of amorphous lactic acid oligomer tackifier may adversely affect the adhesion properties of the hot-melt adhesive.

A hot-melt composition as described herein further comprises a lactic acid and caprolactone copolymer resin.

The lactic acid and caprolactone copolymer resin may generally provide strength and cohesion to the hot-melt adhesive. Without being bound to any theory the inventors believe that high molecular weight copolymers may contribute to a viscosity increase and a desired build-up of viscosity upon cooling, resulting in a desired set time for the hot-melt adhesive. Further, a copolymer having the combination of caprolactone and lactic acid as described herein may contribute to providing hot-melt adhesives with desired open times.

The copolymer resin comprises a polymerisation product of lactic acid monomer and caprolactone (also known in the art as ε-caprolactone). ε-Caprolactone is a cyclic ester molecule with a 7-membered ring. The lactic acid monomer may be derived from one or more of L-lactic acid, D-lactic acid, L-lactide, D-lactide and meso-lactide, and may be preferably derived from L-lactide. The molar ratio of lactic acid monomer over caprolactone may be of at least 1.5, in particular at least 2.0.

The polymerisation product of the copolymer resin may comprise 40-80 wt. % of lactic acid monomer, in particular L-lactic acid monomer, and 20-60 wt. % of caprolactone, in particular may comprise 50-70 wt. % of lactic acid monomer, in particular L-lactic acid monomer, and 30-50 wt. % caprolactone. Although very good results are obtained with copolymer resins based on a polymerisation product of only lactic acid monomer and caprolactone monomer, it is in principle possible to include minor amounts of other monomers (e.g. up to 5 wt. %) in the polymerization to this copolymer product. A skilled person may want to do so for optimizing certain properties.

The Mn molecular weight of the polymerisation product of the copolymer resin may generally be between 2000 and 100000 g/mol. In particular, the Mn molecular weight of the block copolymer may be in the range of 5000-90000 g/mol, in particular 5000-80000 g/mol, more in particular 10000-50000 g/mol. Said Mn can be determined by means of gel permeation chromatography (GPC), in particular, using chloroform as solvent and running phase, using polystyrene as a reference and detection via Refractive Index.

The polymerization product may generally be a random copolymer or a block copolymer (e.g. comprising a block of lactic acid monomer and a block of caprolactone and lactic acid monomer). In a particular embodiment the copolymer resin may be a block copolymer.

In particular, a caprolactone and lactic acid block copolymer as described herein may preferably be a block copolymer comprising a first block and a second block, wherein the first block is an amorphous copolymer of lactic acid and caprolactone and the second block is a crystalline polymer of lactic acid.

The first block may generally be a random block.

Such block copolymers have been described in, for instance, WO 2017/149019. Such block copolymers may be solid at room temperature, which may advantageous for storage and for the formulation of hot-melt adhesives, and at the same time provides the final hot-melt adhesive formulation with desirable properties as described above.

Even though the caprolactone and lactic acid block copolymer may have some advantages, in some applications it may be preferred for the copolymer resin to be a random caprolactone and lactic acid copolymer. Such random copolymer has been described in, e.g., WO 2017/055044. Such random copolymers may allow more flexibility in tuning the hot-melt adhesive to meet specific needs.

Manufacture of the copolymer resin may be performed by (ring-opening) polymerization of lactide and caprolactone by methods known in the art. Reference is made to, for instance, WO 2015/150580 and WO 2017/149019. Polymerization may be catalyzed by means of a catalyst well-known for this purpose, preferably the widely used Sn-octoate or other metal catalysts such as Zr-coordination compounds. For applications in which metal species should be avoided, non-metal catalysts may be used. Polymerization may be performed at a temperature from 120 to 210° C., in particular from 160 to 190° C. Further, polymerization may be carried out in the presence of a linear mono-alcohol and preferably a linear di-alcohol as an initiator, depending on the designed polymer structure. The use of such initiator may allow monitoring and control of the mean molecular weight (Mn) and the polydispersity index (PDI) of the formed copolymer.

A copolymer resin in a hot-melt adhesive as described herein may be present in an amount from 30 to 80 wt. % based on the total weight of hot-melt adhesive, in particular from 40 to 70 wt. %, more in particular from 50 to 65 wt. %

A hot-melt composition as described herein further comprises a crystalline lactic acid oligomer wax.

A crystalline lactic acid oligomer wax may contribute to providing a hot-melt adhesive with desirable set time and viscosity reduction.

The crystalline lactic acid oligomer wax comprises a polymerisation product of a lactic acid monomer selected either from L-lactic acid and/or L-lactide or from D-lactic acid and/or D-lactide, and is preferably L-lactic acid or L-lactide. The lactic acid or lactide used for the preparation of the crystalline oligomer may have a high enantiomeric purity. In particular, the enantiomeric purity of the lactic acid or lactide may be of at least 95%, in particular at least 98% more in particular at least 99% and yet more in particular at least 99.5%. The higher the enantiomeric purity of the oligomer wax the higher may be its crystallinity.

The crystalline oligomer wax may have an enthalpy of melting of at least 5 J/gram, in particular at least 10 J/gram and more in particular at least 25 J/gram as determined via DSC as explained above.

A crystalline oligomer wax as described herein may have a Mn in the range of 750 to 10000 g/mol, in particular of 1500 to 7500 g/mol, more in particular of 2000 to 3000 g/mol, and most in particular of about 2500 g/mol. A wax with a Mn within the defined ranges may contribute to reduce the set time of the composition. When the Mn of the wax is too high, it may become difficult to formulate a composition with an acceptable viscosity for certain applications. When the Mn is too low, it may negatively influence the crystallinity of the oligomer due to the short lactic acid chains and the resulting product may be relatively brittle.

A crystalline oligomer wax in a hot-melt adhesive as described herein may be present in an amount from 0.5 to 30 wt. % based on the total weight of hot-melt adhesive. In particular in an amount of 5 to 25 wt. %. If the amount of the oligomer wax is below 0.5 wt. %, the hot-melt adhesive may show an increase in set time which may not be suitable for some applications. On the other hand, if the amount of oligomer wax is above 30 wt. %, the properties of the hot-melt adhesive may be adversely effected for certain applications, e.g. resulting in poor adhesion overtime due to the high overall crystallinity.

The relative amount of crystalline oligomer wax with respect to other components in the hot-melt adhesive formulation, may be adjusted depending on the amount and nature of other components in the hot-melt adhesive. For instance, if the caprolactone lactic acid copolymer resin comprises a random copolymer, in some embodiments, the relative amount of oligomer wax to copolymer resin may particularly vary from 40:60 to 60:40 and more in particular may be 50:50, and if the caprolactone lactic acid copolymer resin comprises a block copolymer, in some embodiments the relative amount of oligomer wax to copolymer resin may particularly vary from 30:70 to 10:90, and more in particular may be 20:80.

A hot-melt adhesive as described herein may comprise 30-80 wt. % of the copolymer resin, 0.5-30 wt. % of the oligomer wax, and 5-45 wt. % of the amorphous tackifier, based on the total weight of hot-melt adhesive. The amounts of the components may vary as described in detail above for each component.

In addition to a tackifier and a wax as described therein, the hot-melt composition can comprise further tackifiers to further improve the adhesion properties of the composition, or further waxes to further improve the set time and the viscosity. Additional tackifiers and waxes, if present, should be compatible with the other components of the hot-melt adhesive, which can be challenging. Without being limited thereby, useful tackifiers may be the hydrogenated rosin esters type (with examples like Foralyn 5020-F®, Rosin ester, Sylvatac RE12®, Sylvatac RE 5S® and Sylvatac RE 85S®), the terpene phenolic type (with examples like Sylvares TP115P® and Sylvares TP2040HM®) and the styrenated phenolic resin type (with examples like Zonatac NG98®). However, given the excellent properties of a hot-melt composition as described herein such additional tackifiers and waxes may be omitted.

A hot-melt adhesive as described herein may further comprise one or more additional components known in the art for addition to hot-melt adhesive compositions. Such components may be preferably selected from, e.g., a nucleator, an anti-oxidant and a stabilizer. Coloring agents, rheology agents (e.g. to adjust flow behavior), fillers (e.g. to provide volume to the composition), and plasticisers (e.g. to reduce the Tg of the composition) may also be present. Additional components may be preferably present in a total amount of less than 5 wt. % based on the total weight of hot-melt adhesive, in particular less than 3 wt. %.

In a particular embodiment the hot-melt adhesive may comprise a crystalline lactic acid oligomer nucleator. The nucleator may generally be of the opposite enantiochemistry than the oligomer wax. In particular, if the crystalline lactic acid oligomer wax is an oligomer of L-lactic acid monomer, the nucleator may preferably be an oligomer of D-lactic acid, and vice versa, if the crystalline lactic acid oligomer wax is an oligomer of D-lactic acid monomer, the nucleator may preferably be an oligomer of L-lactic acid monomer. With respect to the stereochemical purity and molecular weights (Mn) what is discussed above for the crystalline lactic acid oligomer wax applies to the crystalline lactic oligomer nucleator.

In a particular embodiment the hot-melt adhesive may comprise a carbodiimide stabilizer, such as aliphatic carbodiimides (e.g. dicyclohexyl carbodiimide and isopropyl carbodiimide), and preferably aromatic carbodiimides (e.g. bis-3-isocyanoato-4-methylphenyl carbodiimide) and polymeric forms of carbodiimide compounds. A carbodiimide compound may increase in the stability of the adhesion properties of the hot-melt adhesive.

In a particular embodiment the hot-melt adhesive may comprise an anti-oxidant, such as Irgafos® 126 (3,9-bis(2,4-ditert-butylphenyl)-2,4,8,10-tetraoxa-3,9-diphosphaspiro[5.5]undecane) or Irganox 1010 (pentaerythritol tetrakis(3-(3,5-di-tert-butyl-4-hydroxyphenyl)propionate) as a non-limiting examples. Such antioxidants may help in preventing undesired coloration (from white to yellow or brown) of a hot-melt adhesive as described herein.

Useful fillers and/or rheology modifiers are chalk, barite, quartz, gypsum, calcium oxide, magnesium oxide, silica.

Useful plasticizers are triethyl-citrate (such as in Citrofol Al Regular®), tris(2-ethylhexyl)O-acetylcitrate (such as in Citrofol AHII®), tributyl-citrate (such as in Citrofol BI), and tributyl 0-cetylcitrate ATBC (such as in Citrofol BII®).

A hot-melt adhesive as described herein may generally have a melting temperature in the range of 80–240° C., 90-240° C., 100-240° C., 110-240° C., 120-240° C., 130-240° C., 140-240° C., 150-240° C., 160-240° C., 170-240° C., 180-240° C., 190-240° C., 200-240° C., 210-240° C., 220-240° C., more in particular in the range of 120–220° C., 120-210° C., 120-200° C., 120-190° C., 120-180° C., 120-170° C., 120-160° C. If the melting temperature is too low, the adhesive may melt under conditions of use. High melting temperatures may be unattractive in view the energy consumption required, safety and application stability.

A hot-melt adhesive as described herein may generally have a set time of less than 15 seconds, in particular less than 10 seconds. Set time may be even shorter, such as less than 8 seconds. Set time can be determined by advanced adhesive performance testing, using for example a Smithers Pira Adhesive Performance Tester. The set time is measured on cardboard, applying a 2 mm bead of molten adhesive at 168° C. By narrowing down the amount of seconds applying the secondary substrate, followed by again controlled tearing the bond apart and reviewing the amount of fibre tear, a person skilled in the art can determine the set time.

A hot-melt adhesive as described herein may generally have a viscosity below 8000 mPa·s, in particular below 4000 mPa·s, more in particular below 2000 mPa·s. The viscosity may generally be above 500 mPa·s. Below 500 mPa·s, the composition may be too liquid at application temperature, which would result in "running" of the adhesive. A viscosity above 8000 mPa·s may be too high to allow easy application of the hot-melt adhesive and, e.g. in the case of cardboard, may adversely flow in between the fibers which may be undesired for certain applications. Viscosity can be determined in accordance with ASTM-D 3236-15, at a temperature of 175° C. using spindle 21.

A hot-melt adhesive as described herein can be manufactured by combining the various components in the liquid phase.

In one embodiment, in a first step the amorphous lactic acid oligomer tackifier and the crystalline lactic acid oligomer wax may be provided in the liquid or solid phase, and homogeneously melt blended. In the cases wherein a nucleator is used, in particular a crystalline lactic acid oligomer nucleator, the nucleator may be added to the homogenous molten tackifier/wax blend, and homogeneously melt blended. Alternatively, in the cases wherein a nucleator is used, the tackifier may be melt blended with the nucleator instead of the wax, and then the wax may be added to the tackifier/nucleator blend, and homogeneously melt blended. Either way a homogenous molten mixture is obtained comprising the amorphous lactic acid oligomer tackifier, the crystalline lactic acid oligomer wax and, optionally, the nucleator, in particular a crystalline lactic acid oligomer nucleator. In a second step, the caprolactone-lactic acid copolymer resin is added to the homogeneous molten mixture.

Each component may be added in the liquid phase at relatively high temperature (e.g. of 160-170° C., in particular 163-167° C.) under mixing conditions which may advantageously contribute to fast mixing of the components.

Adding the components in the above described sequences may contribute to preventing the formation of lumps in the mixtures. Without being bound to any theory, the inventors believe that a method as described herein may contribute to generating stereocomplex crystals of small size in the hot-melt composition, contributing to the homogeneity of the final formulation.

The instant invention also relates to the use of a hot-melt adhesive as described herein to bond substrates together. In particular, the instant invention relates to a method for arranging substrates in a fixed position with respect to each other, comprising the steps of applying an amount of a hot-melt adhesive as described herein in liquid form onto a surface of a first substrate, applying a surface of a second substrate onto the amount of hot-melt adhesive composition, and cooling the assembly of substrates and hot-melt adhesive composition to a temperature below the melting point of the hot-melt adhesive composition.

Suitable substrates for a method as described herein include, for instance, elements made of cardboard, paper, optionally provided with a layer of a polymer coating material, e.g. a polyolefin, such as polyethylene, or a polylactide. Particularly preferred may be a method wherein the substrates are elements of a cardboard box. Suitable substrates also include plastics, in particular objects of, e.g., polyolefins or polylactic acid, textiles, foils used in packaging, e.g., the foils used in packaging flowers or plants, but also carpet backings. Suitable substrates further include metal foils and wood.

A hot-melt adhesive as described herein may be used in other applications, like in a pressure sensitive adhesive (PSA), in non-woven applications (e.g. hygiene absorbent products, such as baby diapers, adult incontinent products, feminine hygiene products) and other applications as described in the foregoing paragraphs.

More generally, typical markets for hot-melt adhesives as described herein may be packaging, non-wovens, tapes and labels. Hot-melt adhesives as described herein may also be useful in book binding, foam bonding, heat sealing applications, carpet sealing, bag end sealing, bonding filter media, insulation bonding, durable goods manufacturing (e.g., shoes and other athletic gear), wood working, construction, automotive applications, appliance applications and assembly applications (e.g., filter media, insulation, and bonding).

In another embodiment, provided is a method of using an amorphous polylactic acid tackifier in a hot-melt adhesive comprising the steps of:

i) combining a lactic acid and caprolactone copolymer resin, a crystalline lactic oligomer wax, and amorphous polylactic acid tackifier;
ii) heating the combination from (i); and
iii) applying the hot-melt adhesive to a substrate.

As will be evident to the skilled person, preferred embodiments of various aspects of the invention can be combined, unless they are mutually exclusive. Preferences expressed for the hot-melt adhesive or tackifier according to the invention also apply to the methods and uses of the hot-melt adhesive or tackifier according to the invention.

The present invention is illustrated by the following examples, without being limited thereto or thereby.

EXAMPLES

Preparation of Tackifiers

All oligomer or polymer tackifiers were prepared from monomers as indicated in each of the examples below using a 1 L scale four-necked glass setup reactor with stirring from an overhead stirrer, stannous(II) ethylhexanoate as catalyst, Irgafos® 126 as anti-oxidant and monomeric carbodiimide (Stabaxol® 1) as stabilizer. The polymerization was performed at 180° C. and was stopped after maximum of 3 hours reaction time when the target molecular weight (Mn) was reached.

The number average molecular weight (Mn) was determined by gel permeation chromatography, using a liquid chromatographer with a C18 column, which discriminates on molecular weight, chloroform as solvent and running phase, polystyrene as a reference and detection via Refractive Index.

Example 1: Sorbitol and Lactic Acid Oligomer, Derived from 100 wt. % L-Lactide with an Mn of 3000 g/Mol 751.4 g of L-lactide (Puralact® B3 from Corbion) was polymerized with 48.6 g of D-sorbitol (from Sigma-Aldrich) in the presence of stannous(II) ethylhexanoate, according to the general procedure above. The resulting lactic acid oligomer had an Mn of 3000 g/mol, a crystallinity of below 0.5 J/g, and a Tg of 40.3° C.

Example 2: Sorbitol and Lactic Acid Oligomer, Derived from 88 Wt. % L-Lactide and 12 wt. % D-Lactide and with an Mn of 5000 g/Mol 678.4 g of L-lactide (PURALACT® B3 from Corbion) and 92.5 g of D-lactide (PURALACT® D from Corbion) were polymerized with 29.2 g of sorbitol (from Sigma-Aldrich) in the presence of stannous(II) ethylhexanoate, according to the general procedure above. The resulting lactic acid oligomer had an Mn of 5000 g/mol, a crystallinity of below 0.5 J/g, and a Tg of 38.2° C.

Example 3: Melamine and Lactic Acid Oligomer, Derived from L-Lactide and with an Mn of 3000 g/Mol 719.1 g of L-lactide (PURALACT® B3 from Corbion) was polymerized with 31.8 g of melamine (from Alfa Aesar) in the presence of stannous(II) ethylhexanoate, according to the general procedure above. The resulting lactic acid oligomer had an Mn of 3000 g/mol, a crystallinity of below 0.5 J/g, and a Tg of 45.4° C.

Comparative Example 1: Neopentyl Glycol and Lactic Acid Oligomer, Derived from 88 wt. % L-Lactide and 12 wt. % D-Lactide and with an Mn of 5000 g/Mol 646.3 g of L-lactide (PURALACT® B3 from Corbion) and 88.1 g of D-lactide (PURALACT® D from Corbion) were polymerized with 15.6 g of neopentyl glycol (from Perstorp AB) in the presence of stannous(II) ethylhexanoate, according to the general procedure above. The resulting lactic acid oligomer had an Mn of 5000 g/mol, a crystallinity of less than 0.5 J/g, and a Tg of 36.0° C.

Preparation of Hot-Melt Adhesive Formulations

Hot-melt adhesives (HMA) were prepared using different tackifiers prepared in Examples 1-3 and Comparative Example 1, as detailed in Table 1. Further a reference formulation without tackifier was preferred and HMA formulations were prepared using commercially available tackifiers including rosin resins (e.g. Permalyn™ 5110 from Eastman and Pineclear™ 2498E from Lawter) and hydrocarbon resins (Eastotac™ H-130W, Picco™ A-100, Kristalex™ F-100 and Regalite™ R1100CG from Eastman). These however were not be successfully prepared given the incompatibility of the tackifiers with the copolymer resin and oligomer wax and therefore were not evaluated further.

The hot-melt adhesive formulations all contained 48.5 wt. % of copolymer resin, 18.5 wt. % of oligomer wax, 3 wt. % of a nucleator and 30 wt. % of tackifier. The reference formulation without tackifier contained 48.5 wt. % of oligomer wax (instead of 18.5 wt. % of oligomer wax and 30 wt. % of tackifier). The copolymer resin was a lactic acid caprolactone block copolymer prepared according to Example 1 of WO2017/149019 having an Mn of 15000 g/mol and a lactic acid to caprolactone ratio of 78/22.

The oligomer wax was a crystalline lactic acid oligomer obtained from polymerizing L-lactide (Puralact® B3 with enantiomeric purity of over 99%) as described above for the tackifiers, having an Mn of 2250 g/mol and a crystallinity of greater than 25 J/g.

The nucleator was a crystalline lactic acid oligomer obtained from polymerizing D-lactide (Puralact® D with enantiomeric purity of over 99%) as described above for the tackifiers, having an Mn of 3500 g/mol and a crystallinity greater than 25 J/g.

The HMA formulations were prepared in a glass flask with an overhead stirrer wherein the tackifier was molten at a temperature of 163° C. under stirring, the nucleator was added to the molten tackifier and mixed until molten and a uniform mixture was obtained. The oligomer wax was added and mixed until molten and a uniform mixture was obtained. Finally, the copolymer resin was added in small portions and mixed until molten and a uniform mixture was obtained. The mixture was kept at 163° C. under stirring until applied.

Physical Characterization of the HMA Formulations

The HMA formulations were evaluated by DSC & rheometer measurements.

DSC was determined using a heat-cool-heat cycle starting at −50° C., heating at 10° C./min up to 220° C., then cooling at the same rate and repeating the first heating step.

TA Instrument Dynamic hybrid rheometer 2 was used to determine the complex viscosity of the HMA formulations using an angular frequency 10 rad/s and strain of 10% at 163° C.

The results are displayed in Table 1.

TABLE 1

| | | DSC | | | Viscosity |
|---|---|---|---|---|---|
| Sample | Tackifier | Tg (° C.) | Tm(° C.) | Tc(° C.) | Pa · s |
| Reference | — | −14.1 | 130.1 | 69.5 | 2.03 |
| HMA 1 | Example 1 | 6.94 | 134.11 | — | 1.64 |
| HMA 2 | Example 2 | 8.08 | — | — | 2.13 |
| HMA 3 | Example 3 | 13.34 | 133.53 | 76.77 | 3.42 |
| Comparative HMA 1 | Comparative Example 1 | 5.31 | 132 | — | 1.10 |

Inclusion of a tackifier was found to have significant effects on the thermal properties of the HMA formulations. The glass transition temperature (Tg) of the formulations were significantly higher compared to the reference HMA formulation.

In all four cases the Tc enthalpy appeared to decrease; this might be caused by the reduced amounts of crystalline components and the influence of the tackifier on crystallization rate.

Inclusion of a tackifier was found to significantly reduce the viscosity or to remain significantly the same.

Adhesion Properties of the HMA Formulations

For the adhesion tests three types of cardboard were evaluated. A general single waved cardboard (WP 20/20) was obtained via Smurfit Kappa and two types of thin cardboard (Frovi) from BillerudKorsnäs. A bead of HMA (molten at 163° C.) was applied manually with a glass rod to a cardboard substrates, providing a bead of 1.5 to 2.5 mm. A second cardboard substrate was applied onto the bead to form a bond. 1 and 4 days after making the bond, the bond was pulled apart at an angle of almost 180° to destroy the bond. The percentage fiber tear, was evaluated for each sample by recording the percentage of adhesive covered by fibers.

The results of the adhesion tests is shown in Table 2.

TABLE 2

| Sample | Percentage fiber tear transfer: WP 20/20, 1 day | WP 20/20, 4 days | Frovi 250, 1 day | Frovi 250, 4 days | Frovi 290, 1 day | Frovi 290, 4 days |
|---|---|---|---|---|---|---|
| Reference | 100% | 90% | 75% | 20% | 20% | 0% |
| HMA 1 | 95% | 100% | 90% | 90% | 90% | 90% |
| HMA 2 | 100% | 100% | 90% | 90% | 100% | 95% |
| HMA 3 | 95% | 95% | Na | Na | 70% | 70% |
| Comparative HMA1 | 95% | 95% | 60% | 10% | 60% | 0% |

Results of Table 2 show that HMA formulations with both sorbitol- and melamine-initiated lactic acid oligomer tackifier resins (HMA 1, HMA 2 and HMA 3) have improved adhesion to almost all substrates compared to the reference and comparative example. The reference and Comparative HMA 1 formulation showed to perform significantly worse after 4 days, showing that the addition of the sorbitol lactic acid oligomer tackifier in HMA 1, HMA 2 and HMA 3 improved long term adhesion.

Peel Adhesion Failure Temperature

The peel adhesion failure temperature (PAFT) was determined for most of the above HMA formulations.

The PAFT test was performed as follows:

A bead of HMA (molten at 163° C.) was applied manually with a glass rod to a cardboard substrate, providing a bead of 1.5 to 2.5 mm. A second cardboard substrate was applied onto the bead to form a bond.

24 hours after making the bonds they were suspended with a 100 gram weight attached to the substrate. When either the substrate or the adhesive fails under temperature, the weight drops and the temperature was recorded.

The reference HMA showed a PAFT of over 90° C.

The PAFT of HMA 1 was over 90° C., the PAFT of HMA 2 was 52 and the PAFT of Comparative HMA 1 was over 90° C.

In view of the DSC and rheometry properties of the HMA formulations and the results of the adhesion and PAFT tests HMA 1 was found to have a better overall performance than HMA 2, but both HMA formulations were found to outperform the reference and comparative formulations in most instances.

Influence of Multifunctional Polymerization Initiator on the Properties of the Oligomer Tackifiers Several tackifiers were prepared with the same Mn and lactic acid content but with initiators of varying functionalities to investigate the influence of the multifunctional polymerization initiator on the properties of the tackifier.

The preparation of the tackifier was performed as described above for Example 1 with the lactic acid monomer derived from 100% L-lactide and using different initiators as indicated in Table 3.

The number average molecular weight (Mn) was determined by GPC as described above. The enthalpy of fusion (J/g), the glass transition temperature (Tg) and the melting temperature (Tm) were of determined by differential scanning calorimetry (DSC) as described above.

The results are provided in Table 3.

TABLE 3

| Sample | Initiator | Mn (g/mol) | Tg (° C.) | Tm (° C.) | enthalpy (J/g) |
|---|---|---|---|---|---|
| Comparative Example 2 | neopentyl glycol | 5600 | 43.3 | 148.7 | 22.7 |
| Example 4 | trimetylol propane | 5600 | 40.47 | 138.7 | 2.5 |
| Example 5 | pentaerythriol | 5600 | 42.98 | Na | 0 |
| Example 6 | Sorbitol | 5600 | 36.9 | Na | 0 |

Adhesion Properties of HMA with Varying Amount of Tackifier

HMA formulations were prepared with varying amounts of tackifier of Example 1 as detailed in Table 4, to evaluate the influence of the tackifier amounts on the adhesion properties of HMA formulations.

TABLE 4

| Sample | Tackifier wt. % | Copolymer resin wt. % | Oligomer wax wt. % | nucleator wt. % |
|---|---|---|---|---|
| HMA - 0% | 0 | 90 | 9 | 1 |
| HMA - 5% | 5 | 85 | 9 | 1 |
| HMA - 15% | 15 | 75 | 9 | 1 |
| HMA - 25% | 25 | 65 | 9 | 1 |
| HMA - 35% | 35 | 55 | 9 | 1 |
| HMA - 45% | 45 | 45 | 9 | 1 |

The HMA formulations further comprised the same copolymer resin, oligomer wax and nucleator as described above for the HMA 1 and HMA 2 formulations, and were prepared as follows. In a glass flask with an overhead stirrer the tackifier was molten at a temperature of 163° C. under stirring, the nucleator was added to the molten tackifier and mixed until molten and a uniform mixture was obtained. The oligomer wax was added and mixed until molten and a uniform mixture was obtained. Finally the copolymer resin was added in small portions and mixed until molten and a uniform mixture was obtained. The mixture was kept at 163° C. under stirring until applied. The adhesion of the different HMA formulations were tested on a Frovi 250 cardboard. A bead of HMA (molten at 163° C.) was applied manually with a glass rod to a cardboard substrate, providing a bead of 1.5 to 2.5 mm. A second cardboard substrate was applied onto the bead to form a bond. Subsequently all test substrates were stored at −20° C., 20° C. and 52° C. in duplicate and tested on adhesion. The bond was pulled apart at an angle of almost 180° to destroy the bond. The percentage fiber tear, was evaluated for each sample by recording the percentage of adhesive covered by fibers. The adhesion value is expressed in the perceptual amount of fibers transferred on the applied adhesive after pulling of the cardboard strip (% Fiber tear).

The results are presented in tables 5, 6 and 7.

TABLE 5

Percentage fiber tear after storage at room temperature (% at 20° C.)

| Hours of storage after application | Percentage of tackifier in HMA formulation (wt. %): 0 | 5 | 15 | 25 | 35 | 45 |
|---|---|---|---|---|---|---|
| 0.5 | 50 | 85 | 90 | 100 | 75 | 5 |
| 24 | 5 | 50 | 70 | 90 | 75 | 5 |
| 168 | 5 | 5 | 30 | 80 | 75 | 5 |

TABLE 6

| Percentage fiber tear after storage at deep-freezer temperature (% at −20° C.) | | | | | | |
|---|---|---|---|---|---|---|
| Hours of storage | Percentage of tackifier in HMA formulation (wt. %) | | | | | |
| after application | 0 | 5 | 15 | 25 | 35 | 45 |
| 0.5 | 5 | 40 | 90 | 90 | 5 | 0 |
| 24 | 5 | 25 | 90 | 85 | 0 | 0 |
| 168 | 5 | 10 | 20 | 40 | 0 | 0 |

TABLE 7

| Percentage fiber tear after storage at high temperature (% at 52° C.) | | | | | | |
|---|---|---|---|---|---|---|
| Hours of storage | Percentage of tackifier in HMA formulation (wt. %) | | | | | |
| after application | 0 | 5 | 15 | 25 | 35 | 45 |
| 0.5 | 5 | 85 | 100 | 90 | 90 | 5 |
| 24 | 1 | 15 | 95 | 90 | 90 | 90 |
| 168 | 1 | 70 | 90 | 90 | 90 | 90 |

The data shows at different temperatures the retention of adhesion is significantly increased by the use of a tackifier resin. The optimal amount of tackifier may depend on the temperature of the final application.

An optimum amount of tackifier which would provide good adhesion performance over a broad range of temperatures (e.g. from −20° C. to 52° C.) both at the start and over time was found to be of, e.g., 15-35 wt %.

The invention claimed is:

1. A hot-melt adhesive (HMA) comprising:

a lactic acid and caprolactone copolymer resin, a crystalline lactic acid oligomer wax, and an amorphous lactic acid oligomer tackifier, wherein the amorphous lactic acid oligomer tackifier has a crystallinity as defined by its enthalpy of melting of at most 2.5 J/g and comprises an amorphous polymerisation product of a) lactic acid monomer and b) a multifunctional polymerization initiator containing three or more hydroxy and/or amino groups, wherein the amorphous polymerisation product of the amorphous lactic acid oligomer tackifier has a number average molecular weight ($M_n$) of 1000 to 10000 g/mol.

2. The hot-melt adhesive according to claim 1, wherein the multifunctional polymerization initiator of the amorphous lactic acid oligomer tackifier contains three or more hydroxy groups.

3. The hot-melt adhesive according to claim 1, wherein the amorphous polymerisation product of the amorphous lactic acid oligomer tackifier has a number average molecular weight ($M_n$) of 2000-4000 g/mol.

4. The hot-melt adhesive according to claim 2, wherein the multifunctional polymerization initiator of the amorphous lactic acid oligomer tackifier is selected from D-sorbitol, pentaerythritol and dipentaerythritol.

5. The hot-melt adhesive according to claim 1, wherein the lactic acid monomer of the amorphous lactic acid oligomer tackifier is derived from one or more of L-lactic acid, D-lactic acid, L-lactide, D-lactide and meso-lactide.

6. The hot-melt adhesive according to claim 1, wherein the ratio of lactic acid monomer per hydroxy or amino group of the multifunctional polymerization initiator in the amorphous polymerization product is of 2-25 moles of lactic acid per moles of hydroxy group or amino group.

7. The hot-melt adhesive according to claim 1 comprising 30-80 wt. % of the copolymer resin, 0.5-30 wt. % of the oligomer wax, and 5-45 wt. % of the amorphous tackifier, based on the total weight of hot-melt adhesive.

8. The hot-melt adhesive according to claim 1, further comprising one or more additional components selected from a nucleator, an anti-oxidant and a stabilizer.

9. The hot-melt adhesive according to claim 1, wherein the copolymer resin is a block copolymer comprising a first block and a second block, wherein the first block is an amorphous copolymer of lactic acid and caprolactone and the second block is a crystalline polymer of lactic acid.

10. An amorphous polylactic acid tackifier for use in a hot-melt adhesive (HMA) according to claim 2, comprising an amorphous polymerisation product of a) lactic acid monomer and b) a multifunctional polymerization initiator containing four or more hydroxy groups, wherein the amorphous polymerisation product has a number average molecular weight ($M_n$) of 1000 to 10000 g/mol, wherein the amorphous polylactic acid tackifier has a crystallinity as defined by its enthalpy of melting of at most 2.5 J/g and a glass transition temperature of at least 30° C.

11. A method for preparing the amorphous polylactic acid tackifier according to claim 10, comprising forming an amorphous polymerisation product by reacting a) lactic acid and/or lactide and b) a multifunctional polymerization initiator containing four or more hydroxy groups, until a polymerisation product with a number average molecular weight ($M_n$) of 1000 to 10000 g/mol is obtained.

12. A method comprising adding an amorphous polylactic acid tackifier to a hot-melt adhesive comprising a lactic acid and caprolactone copolymer resin and a crystalline lactic acid oligomer wax, wherein the tackifier and the hot-melt adhesive are as defined in claim 1.

13. A method for arranging substrates in a fixed position with respect to each other, comprising the steps of applying an amount of a hot-melt adhesive according to claim 1 in liquid form onto a surface of a first substrate, applying a surface of a second substrate onto the amount of hot-melt adhesive composition, and cooling the assembly of substrates and hot-melt adhesive composition to a temperature below the melting point of the hot-melt adhesive composition.

14. The method for arranging substrates in a fixed position with respect to each other according to claim 13, wherein the substrates are elements of a cardboard box.

* * * * *